United States Patent
Iijima et al.

(10) Patent No.: US 9,318,989 B2
(45) Date of Patent: Apr. 19, 2016

(54) THREE-PHASE AC INDUCTION MOTOR CONTROL DEVICE AND THREE-PHASE AC INDUCTION MOTOR CONTROL METHOD

(71) Applicant: NISSAN MOTOR CO., LTD., Yokohama-shi, Kanagawa (JP)

(72) Inventors: Yoshihiro Iijima, Yokohama (JP); Hideo Nakamura, Yokohama (JP); Shiho Umeki, Yokohama (JP); Kazuhiko Tazoe, Fujisawa (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 27 days.

(21) Appl. No.: 14/386,489

(22) PCT Filed: Mar. 11, 2013

(86) PCT No.: PCT/JP2013/056622
§ 371 (c)(1),
(2) Date: Sep. 19, 2014

(87) PCT Pub. No.: WO2013/141059
PCT Pub. Date: Sep. 26, 2013

(65) Prior Publication Data
US 2015/0048774 A1    Feb. 19, 2015

(30) Foreign Application Priority Data

Mar. 22, 2012  (JP) ................................. 2012-065887

(51) Int. Cl.
*H02P 27/00*   (2006.01)
*H02P 21/08*   (2006.01)
(Continued)

(52) U.S. Cl.
CPC ............ *H02P 21/08* (2013.01); *H02P 21/0025* (2013.01); *H02P 23/14* (2013.01); *H02P 2207/01* (2013.01)

(58) Field of Classification Search
CPC .................................. H02P 21/08; H02P 23/14
USPC ............. 318/400.01, 400.02, 400.14, 400.15, 318/700, 727, 778, 779, 800, 801, 805, 808, 318/809, 810, 812, 823, 825, 430, 432, 434, 318/632; 363/40, 95, 21.11, 47, 74, 176
See application file for complete search history.

(56) References Cited

U.S. PATENT DOCUMENTS 8,344,680 B2 *  1/2013  Kitanaka ....................... 318/632
8,674,647 B2 *  3/2014  Iwaji et al. ..................... 318/700
(Continued)

FOREIGN PATENT DOCUMENTS

EP    2 211 457 A1    7/2010
JP    64-020688 A     1/1989
JP    9-047097 A      2/1997

OTHER PUBLICATIONS

L. Umanand et al., Adaptation of the Rotor Time Constant for Variations in the Rotor Resistance of an Induction Motor, Power Electronics Specialists Conference, PESC, IEEE, 1994, pp. 738-743.
(Continued)

*Primary Examiner* — Antony M Paul
(74) *Attorney, Agent, or Firm* — Foley & Lardner LLP (57) ABSTRACT

Disclosed is a three-phase AC induction motor control device for controlling a torque based on a two-axis orthogonal coordinate system in synchronization with a power supply angular frequency, the control device including: a non-interference controller configured to receive a motor rotation speed, a torque command value, and a power supply voltage as an input and compute a torque axis non-interference compensation voltage and a magnetic flux axis non-interference compensation voltage by referencing a map stored in advance; and a non-interference magnetic flux response filter configured to perform filtering, including a direct transfer term and a rotor magnetic flux response delay, for the torque axis non-interference compensation voltage.

6 Claims, 8 Drawing Sheets

(51) Int. Cl.
*H02P 23/14* (2006.01)
*H02P 21/00* (2006.01)

(56) References Cited

U.S. PATENT DOCUMENTS

2010/0259207 A1* 10/2010 Kitanaka .................. 318/400.17

2011/0204831 A1* 8/2011 Iwaji et al. .................... 318/244

OTHER PUBLICATIONS

D. Fodor et al., Digitized Vector Control of Induction Motor with DSP, Industrial Electronics, Control and Instrumentation, vol. 3, Sep. 5, 1994, pp. 2057-2062.

* cited by examiner

THREE-PHASE AC INDUCTION MOTOR CONTROL DEVICE AND THREE-PHASE AC INDUCTION MOTOR CONTROL METHOD

TECHNICAL FIELD

The present invention relates to a control of an induction motor.

BACKGROUND ART

As a control of an induction motor, there is known a vector control for an induction motor, in which a three-phase AC current flowing through a stator is transformed into a two-axis orthogonal coordinate system in synchronization with a power supply angular frequency corresponding to a sum of a motor electric angular frequency and a slip frequency to generate an excitation current and a torque current, and the motor torque is controlled by adjusting the excitation current and the torque current.

When the slip angular frequency is controlled to be proportional to a ratio between the torque current and the rotor magnetic flux, the induction motor torque is proportional to a product between a rotor magnetic flux generated with a delay from the excitation current and a torque current orthogonal to the rotor magnetic flux. In addition, there is known a technique of providing a non-interference controller that cancels an interference term in advance in order to perform a control independently because the axes interfere with each other.

For example, in JP09-047097A, there is disclosed a technique of computing an interference voltage using a mathematical model by receiving an electric current command value as an input. In addition, in JP01-020688A, there is disclosed a technique of computing a non-interference voltage using a mathematical model by receiving a real electric current as an input.

SUMMARY OF INVENTION

However, for example, parameters used in the control described above, such as a self-inductance or a mutual inductance, change depending on a driving condition such as a torque or a rotation speed. Such a parameter change has non-linearity. However, the technique disclosed in JP09-047097A or JP01-020688A does not take account of an error caused by a parameter change. Therefore, responses of the torque and the electric current may become irregular.

In the control of the induction motor, the rotor magnetic flux generated by the excitation current inevitably has a delay. However, the technique disclosed in JP09-047097A or JP01-020688A does not take account of such a delay. That is, since the control is performed based on an input obtained by neglecting a transient response period until the rotor magnetic flux is generated, the control response may become instable in practice.

It is therefore an object of this disclosure to stably control an induction motor by avoiding an influence of a parameter error caused by a driving condition and an influence caused by a response delay of a rotor magnetic flux.

According to an aspect of this disclosure, there is provided a three-phase AC induction motor control device configured to control a torque based on a two-axis orthogonal coordinate system in synchronization with a power supply angular frequency. The three-phase AC induction motor control device includes: a non-interference controller configured to receive a motor rotation speed, a torque command value, and a power supply voltage as an input and compute a torque axis non-interference compensation voltage and a magnetic flux axis non-interference compensation voltage by referencing a map stored in advance; and a non-interference magnetic flux response filter configured to perform filtering, including a direct transfer term and a rotor magnetic flux response delay, for the torque axis non-interference compensation voltage.

The foregoing and additional features and characteristics of this disclosure will become more apparent from the following detailed description considered with the reference to the accompanying drawings.

DESCRIPTION OF EMBODIMENTS

Hereinafter, embodiments of this disclosure will be described with reference to the accompanying drawings.

First Embodiment

Figure 1:
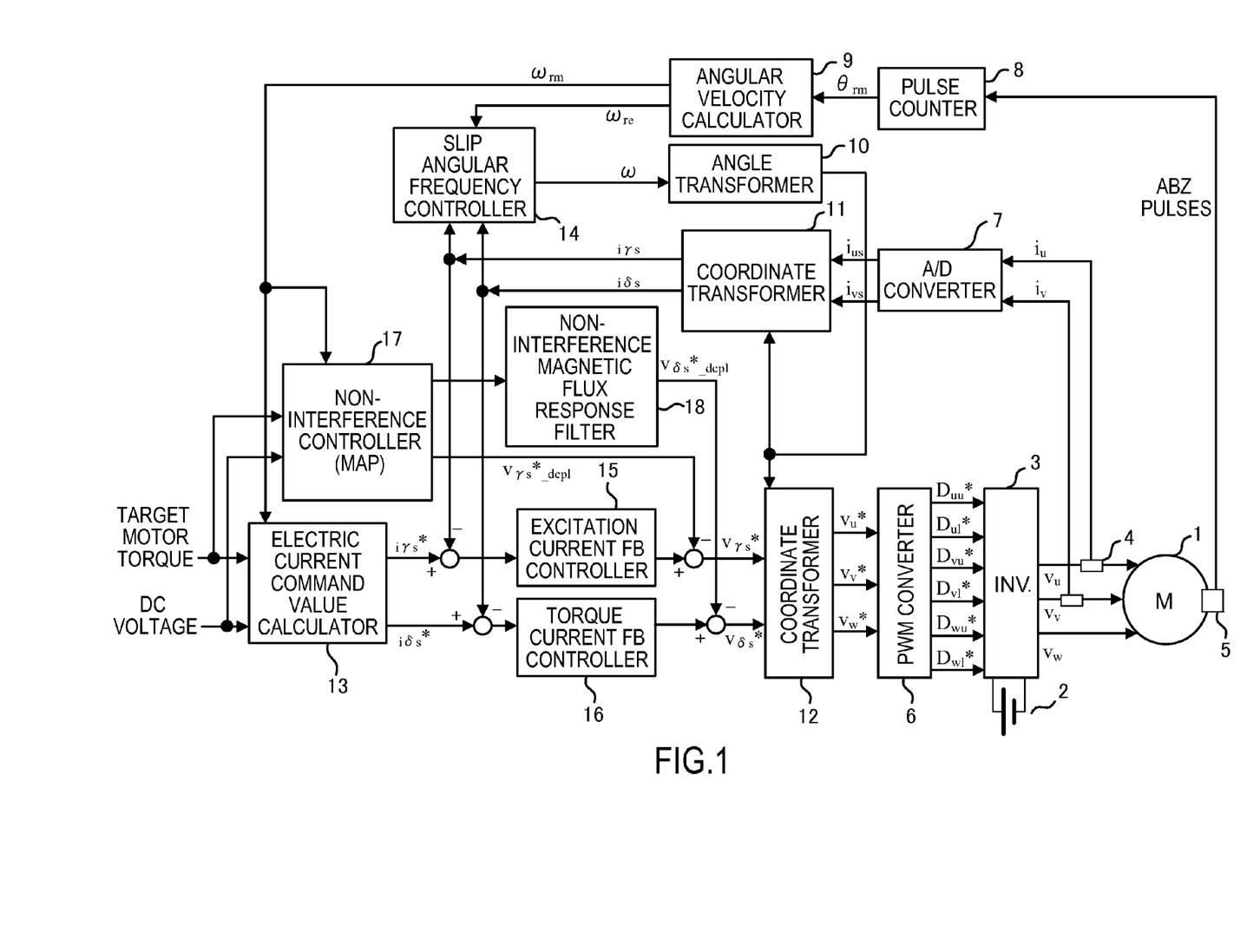
FIG. 1 is a block diagram illustrating a control system of a three-phase AC induction motor according to a first embodiment.

FIG. 1 is a block diagram illustrating a control system of a three-phase AC induction motor according to a first embodiment. In this control system, electric power is supplied to a three-phase AC induction motor (hereinafter, simply referred to as an "induction motor") from a DC power supply 2 through an inverter 3, and a torque control is performed based on a two-axis orthogonal coordinate system in synchronization with a power supply angular frequency.

The DC power supply 2 is a power supply capable of supplying a high voltage, such as a stack type lithium ion battery.

A pulse width modulation (PWM) converter 6 receives three-phase voltage command values $v_u^*$, $v_v^*$, and $v_w^*$ computed by a coordinate transformer 12 described below and generates PWM_Duty driving signals $D_{uu}^*$, $D_{ul}^*$, $D_{vu}^*$, $D_{vl}^*$, $D_{wu}^*$, and $D_{wl}^*$ of a switching element (such as IGBT) of the inverter 3 based on such command values.

The inverter 3 is a three-phase voltage type inverter, which switches a DC voltage of the DC power supply 2 to an AC voltage depending on the PWM_Duty driving signal $D_{uu}^*$, $D_{ul}^*$, $D_{vu}^*$, $D_{vl}^*$, $D_{wu}^*$, and $D_{wl}^*$ and supplies the resulting voltage to the induction motor 1.

An electric current sensor 4 detects an electric current having at least two phases (for example, U-phase and V-phase) $i_u$ and $i_v$ out of the three-phase current supplied from the inverter 3 to the induction motor 1 and inputs it to the A/D converter 7. The A/D converter 7 inputs the current values $i_{us}$ and $i_{vs}$ obtained by performing A/D conversion for the current values $i_u$ and $i_v$ into the coordinate transformer 11. It is noted that, when the electric current sensor 4 is provided for two phases such as a U-phase and a V-phase as illustrated in FIG. 1, the W-phase current value $i_w$ for which no electric current sensor 4 is provided is computed based on Formula (1). Naturally, all of the three-phase currents may also be detected using sensors.

[Formula 1]

$$i_{ws} = -i_{ws} - i_{vs} \quad (1)$$

A magnetic pole position detector 5 inputs an A-phase pulse, a B-phase pulse, or a Z-phase pulse to a pulse counter 8 depending on a rotor angle of the induction motor 1. The pulse counter 8 computes a mechanical angle $\theta_{rm}$ of the rotor based on the input pulse and outputs the resulting angle to the angular velocity calculator 9.

The angular velocity calculator 9 computes a mechanical angular velocity $\omega_{rm}$ of the rotor and an electrical angular velocity $\omega_{re}$ of the rotor by multiplying the mechanical angular velocity $\omega_{rm}$ of the rotor by the number p of pole pairs of the motor based on a temporal change rate of the input mechanical angle $\theta_{rm}$.

The coordinate transformer 12 transforms a two-axis orthogonal DC coordinate system (γ-δ axes) rotating at a power supply angular velocity ω described below into a three-phase AC coordinate system (uvw axes). The coordinate transformer 12 receives a γ-axis voltage command value (excitation voltage command value) $v\gamma_s^*$, a δ-axis voltage command value (torque voltage command value) $v\delta_s^*$, and a power supply angle θ obtained by integrating the power supply angular velocity ω using the angle transformer 10, computes the UVW-phase voltage command values $v_u^*$, $v_v^*$, and $v_w^*$ through a coordinate transformation process of Formula (2), and outputs the UVW-phase voltage command values $v_u^*$, $v_v^*$, and $v_w^*$ to the PWM converter 6.

[Formula 2]

$$\begin{bmatrix} v_u^* \\ v_v^* \\ v_w^* \end{bmatrix} = \sqrt{\frac{2}{3}} \begin{bmatrix} 1 & 0 \\ -\frac{1}{2} & \frac{\sqrt{3}}{2} \\ -\frac{1}{2} & -\frac{\sqrt{3}}{2} \end{bmatrix} \begin{bmatrix} \cos\theta' & -\sin\theta' \\ \sin\theta' & \cos\theta' \end{bmatrix} \begin{bmatrix} v_{\gamma s}^* \\ v_{\delta s}^* \end{bmatrix} \quad (2)$$

The coordinate transformer 11 transforms the three-phase AC coordinate system (uvw axes) to the two-axis orthogonal DC coordinate system (γ-δ axes) described above. The coordinate transformer 11 receives a U-phase current $i_{us}$, a V-phase current $i_{vs}$, a W-phase current $i_{ws}$ obtained through Formula (1), and the angle θ obtained by integrating the power supply angular velocity ω using the angle transformer 10 and computes the γ-axis current (excitation current) $i\gamma_s$ and the δ-axis current (torque current) $i\delta_s$ based on Formula (3).

[Formula 3]

$$\begin{bmatrix} i_{\gamma s} \\ i_{\delta s} \end{bmatrix} = \begin{bmatrix} \cos\theta & \sin\theta \\ -\sin\theta & \cos\theta \end{bmatrix} \cdot \sqrt{\frac{2}{3}} \begin{bmatrix} 1 & -\frac{1}{2} & -\frac{1}{2} \\ 0 & \frac{\sqrt{3}}{2} & -\frac{\sqrt{3}}{2} \end{bmatrix} \begin{bmatrix} i_{us} \\ i_{vs} \\ i_{ws} \end{bmatrix} \quad (3)$$

The electric current command value calculator 13 receives a target motor torque, a motor rotation speed (mechanical angular velocity $\omega_{rm}$), and a DC power supply voltage $V_{dc}$ and computes a γ-axis current command value (excitation current command value) $i\gamma_s^*$ and a δ-axis current command value (torque current command value) $i\delta_s^*$. It is noted that the DC power supply voltage $V_{dc}$ is directly detected using a voltage sensor. The target motor torque is set using a torque setting unit (not illustrated). For example, if this system is applied to an electric vehicle, the target torque is set based on a depression level of an accelerator pedal from a driver and the like.

A non-interference controller 17 receives the target motor torque, the motor rotation speed (mechanical angular velocity $\omega_{rm}$), and the DC power supply voltage $V_{dc}$, reads a non-interference compensation voltage (a torque axis non-interference compensation voltage or a magnetic flux axis non-interference compensation voltage) necessary to compensate for an interference voltage between the γ-δ orthogonal coordinate axes from a map stored in a memory in advance, and outputs the non-interference compensation voltage. For the magnetic flux axis, the value of the map is directly added to the voltage command value $v\gamma_s^*$ as a magnetic flux axis non-interference compensation voltage $v\gamma_{s\_dcpl}$. For the torque axis, a value obtained by filtering the value of the map using a non-interference magnetic flux response filter 18 is added to the voltage command value $v\delta_s^*$ as a torque axis non-interference compensation voltage $v\delta_{s\_dcpl}$. The non-interference controller 17 and the non-interference magnetic flux response filter 18 will be described in detail below.

A γ-axis current feedback controller (excitation current feedback (FB) controller) 15 performs a process of causing the measured γ-axis current value (excitation current) $i\gamma_s$ to follow the γ-axis current command value (excitation current command value) $i\gamma_s^*$ with desired responsiveness without a steady-state offset. Similarly, a δ-axis current feedback controller (torque current FB controller) 16 also performs a process of causing the δ-axis current (torque current) $i\delta_s$ to follow the δ-axis current command value (torque current command value) $i\delta_s^*$.

Typically, if the γ-δ axes non-interference voltage correction is operated ideally, it provides a simple control target characteristic of one-input and one-output. Therefore, the γ-axis current feedback controller 15 and the δ-axis current feedback controller 16 can be implemented using a simple PI feedback compensator.

A value obtained by correcting the voltage command value output from the γ-axis current feedback controller 15 with the non-interference voltage $v\gamma_{s\_dcpl}^*$ described above is the γ-axis voltage command value (excitation voltage command value) vγ$_s$* input to the coordinate transformer 12. Similarly, a value obtained by correcting a voltage command value output from the δ-axis current feedback controller 16 using the non-interference voltage vδ$_{s\_dcp1}$* described above is the δ-axis voltage command value (torque voltage command value) vδ$_s$* input to the coordinate transformer 12.

The slip frequency controller 14 receives the γ-axis current (excitation current) iγ$_s$ and the δ-axis current (torque current) iδ$_s$ and computes the slip angular velocity ω$_{se}$ based on Formula (4). It is noted that Formula (4) describes only steady-state values. A value obtained by adding the computed slip angular velocity ω$_{se}$ to the rotor electric angular velocity ω$_{re}$ is output as the power supply angular velocity ω. By performing the slip frequency control, the torque of the induction motor is proportional to a product between the γ-axis current (excitation current) iγ$_s$ and the δ-axis current (torque current) iδ$_s$.

[Formula 4]

$$\omega_{se} = \frac{R_r}{L_r} \cdot \frac{i_{\delta s}}{i_{\gamma s}} \quad (4)$$

Here, the non-interference controller 17 and the non-interference magnetic flux response filter 18 will be described in detail.

As described above, the non-interference controller 17 receives the target motor torque, the motor rotation speed (mechanical angular velocity ω$_{rm}$), and the DC power supply voltage V$_{dc}$ as input values and stores a map for extracting the non-interference compensation voltage necessary to compensate for the interference voltage between the γ-δ orthogonal axis coordinates in a memory in advance. It is difficult to store, in this map, the non-interference compensation voltage in consideration of a transient response. In this regard, the steady-state non-interference compensation voltages appropriate to each input value are obtained in advance through experiments and are stored.

The non-interference magnetic flux response filter 18 performs filtering for the torque axis non-interference compensation voltage output from the non-interference controller 17, including a direct transfer term expressed in a transfer function of Formula (5) and a rotor magnetic flux response delay.

[Formula 5]

$$G_1(s) = \sigma + (1 - \sigma)\frac{1}{\tau_f \cdot s + 1} \quad (5)$$

It is noted that a factor σ of Formula (5) denotes a leakage coefficient set to "σ=1−M²/(L$_s$·L$_r$)." "τ$_f$" denotes a time constant of the rotor magnetic flux response delay and is typically defined as a ratio L$_r$/R$_r$ between the inductance L$_r$ of the rotor side (second order side) and the resistance R$_r$. "s" denotes a Laplacian operator.

As described above, since the non-interference controller 17 computes the non-interference compensation voltage by referencing the map, it is possible to accurately perform non-interference compensation by avoiding an influence from a steady-state parameter error caused by a driving condition such as the torque, the rotation number, and the power supply voltage, and an influence from the response delay of the magnetic flux of the rotor. As a result, it is possible to remarkably improve responsiveness of an electric current control system. In addition, the number of operations such as multiplication, addition, or subtraction is relatively small, and an operation period can be set to be relatively long. This also contributes to reduction of a computation load.

Figure 2A:
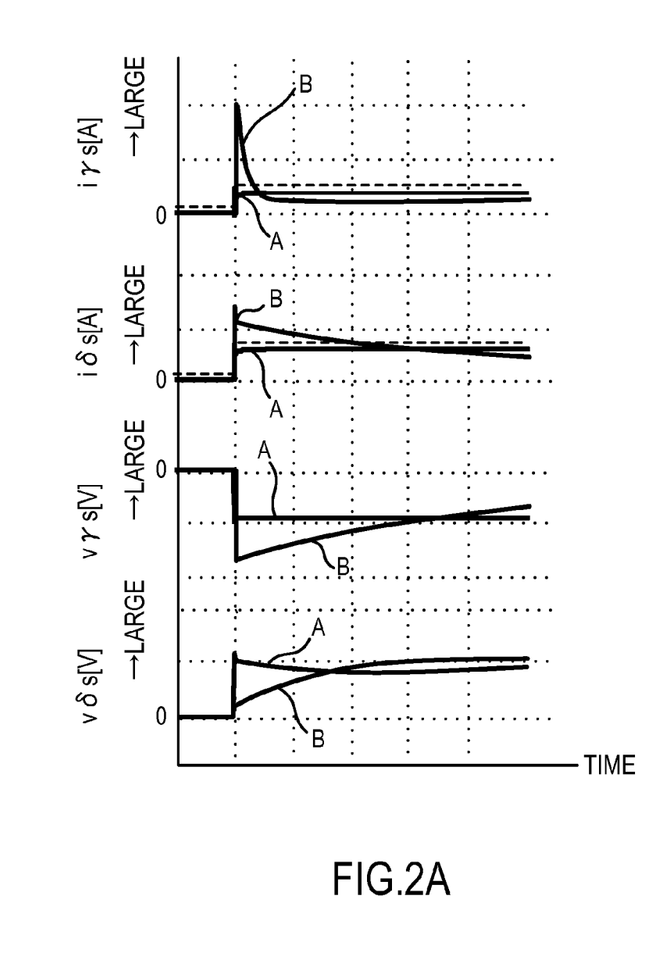
FIG. 2A is a timing chart illustrating current values and voltage values for describing the effects of the first embodiment.
Figure 2B:
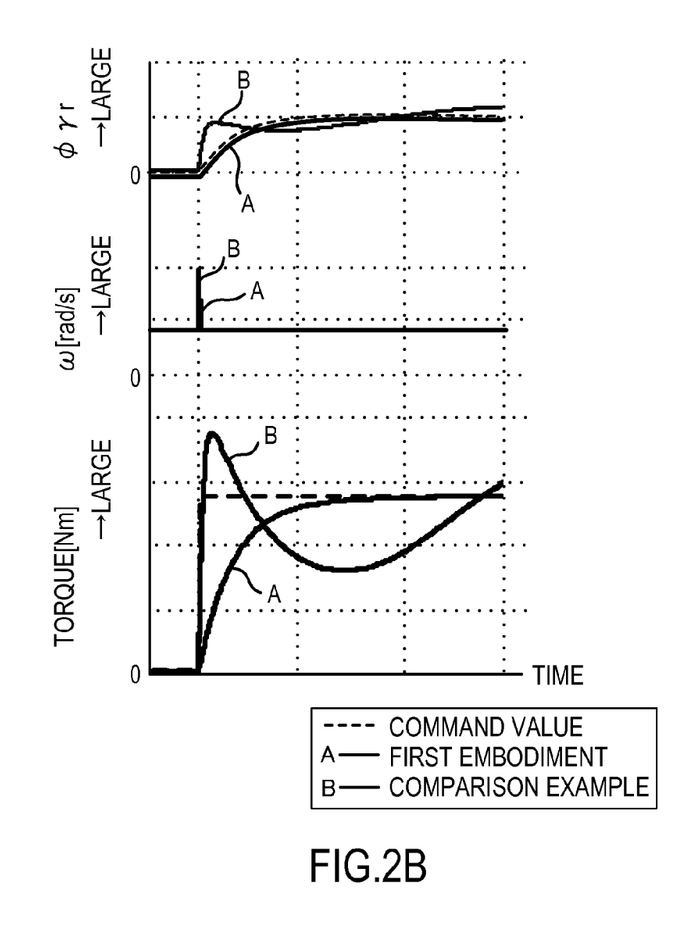
FIG. 2B is a timing chart illustrating a rotor magnetic flux, a power supply angular frequency, and a torque for describing the effects of the first embodiment.

FIGS. 2A and 2B are timing charts illustrating a result of comparison of a torque step response between the first embodiment and a comparison example. In the comparison example, the non-interference compensation voltage is computed simply by referencing a map without using the non-interference magnetic flux response filter 18. In FIG. 2A, the excitation current iγ$_s$, the torque current iδ$_s$, the magnetic flux axis component voltage vγ$_s$, and the torque axis component voltage vδ$_s$ are illustrated sequentially from the top to the bottom. In FIG. 2B, the rotor magnetic flux φγ$_r$, the power supply angular frequency ω, and the motor torque are illustrated sequentially from the top to the bottom. In the drawings, dotted lines denote command values. It is noted that it is assumed here that there is no parameter error.

Comparing FIGS. 2A and 2B, it is recognized that the transient responsiveness of the γ-axis current (excitation current) iγ$_s$, the δ-axis current (torque current) iδ$_s$, or the torque are improved by providing the non-interference magnetic flux response filter 18.

As described above, according to the first embodiment, the non-interference controller 17 outputs the non-interference compensation voltage by referencing a map based on a driving condition. Therefore, it is possible to reduce a computation load and avoid an influence from a change of the parameter caused by a driving condition. In addition, the non-interference magnetic flux response filter 18 performs filtering for the torque axis interference compensation voltage, which is one of the output values of the non-interference controller 17, including the direct transfer term and the rotor magnetic flux response delay. Therefore, it is possible to accurately perform non-interference compensation by avoiding an influence from the response delay of the rotor magnetic flux. As a result, it is possible to remarkably improve responsiveness of the electric current control system.

Second Embodiment

Figure 3:
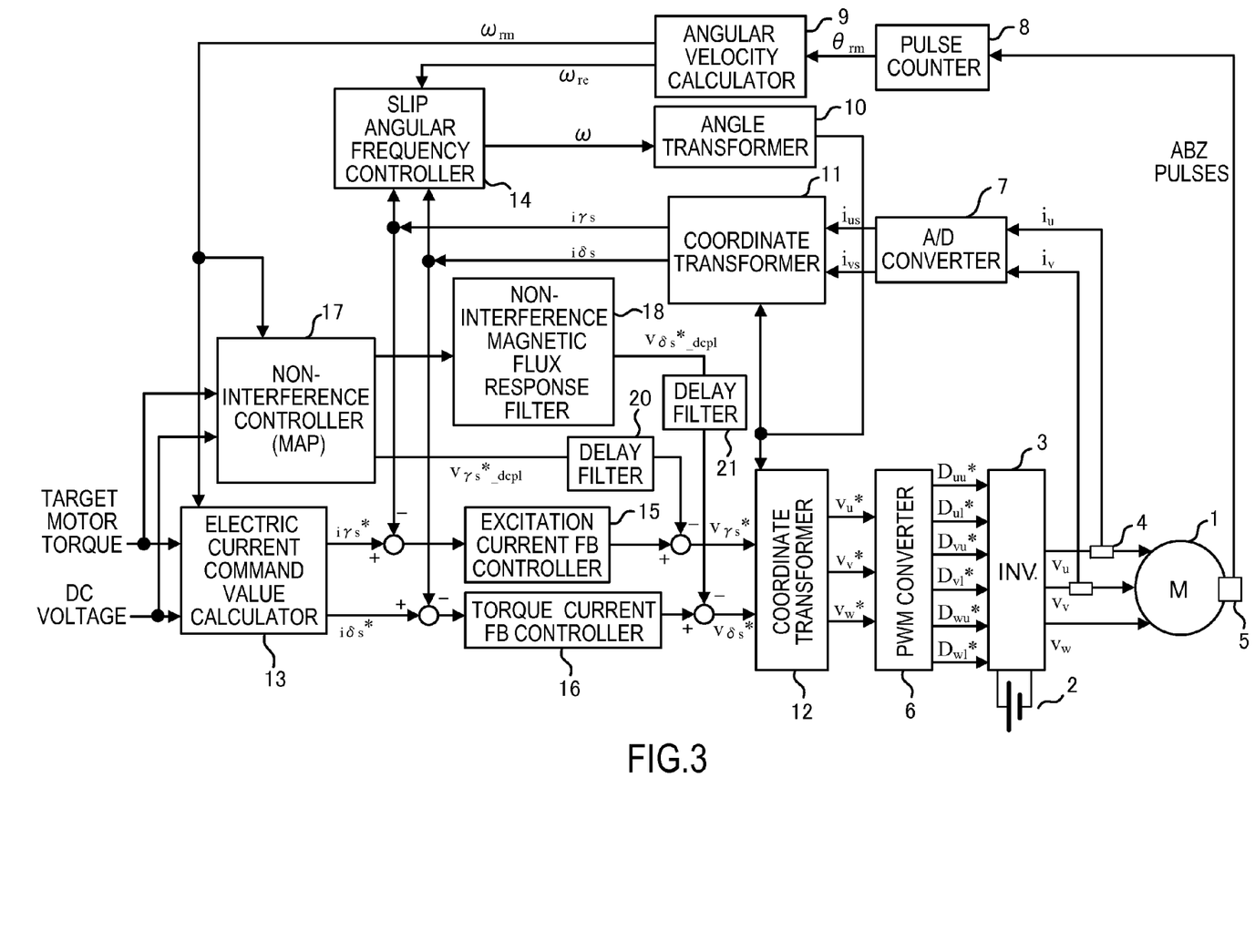
FIG. 3 is a block diagram illustrating a control system of a three-phase AC induction motor according to a second embodiment.

FIG. 3 is a block diagram illustrating a control system of a three-phase AC induction motor according to a second embodiment.

Unlike the first embodiment, electric current delay filters 20 and 21 are provided to perform filtering for the γ-axis and δ-axis non-interference compensation voltages. Hereinafter, a description will focus on a difference between the first and second embodiments.

As the electric current delay filters 20 and 21, a digital filter obtained by discretizing a transfer characteristic G$_2$(s) of Formula (6) using Tustin's approximation or the like is employed. A time constant τ$_c$ is determined depending on a response delay of the electric current feedback control system.

[Formula 6]

$$G_2(s) = \frac{1}{\tau_c \cdot s + 1} \quad (6)$$

Since the electric current delay filters 20 and 21 are provided to perform a delay process including simulation of a delay in the electric current control as described above, it is possible to accurately perform non-interference compensation at a high frequency and improve torque responsiveness even at a high frequency range.

Figure 4A:
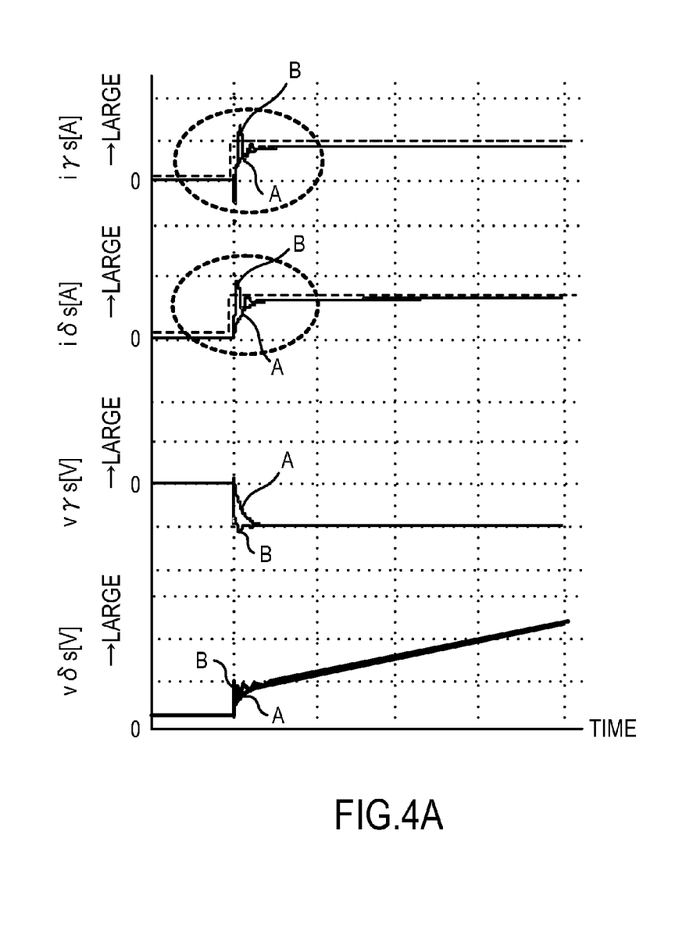
FIG. 4A is a timing chart illustrating current values and voltage values for describing the effects of the second embodiment.
Figure 4B:
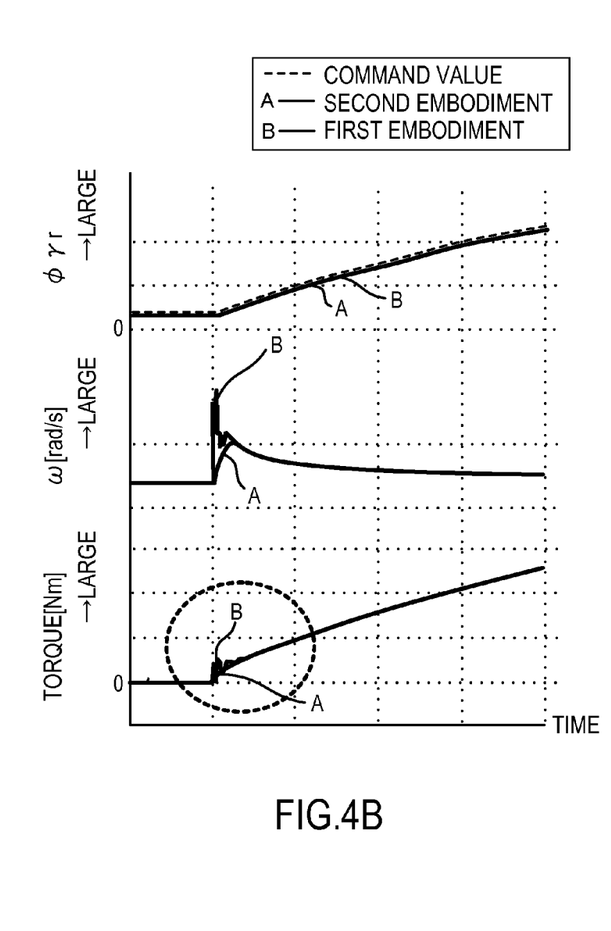
FIG. 4B is timing chart illustrating a rotor magnetic flux, a power supply angular frequency, and a torque for describing the effects of the second embodiment.

FIGS. 4A and 4B are diagrams illustrating a result of comparison of the torque step response between the second embodiment and the first embodiment. It is noted that the scales of the ordinates and abscissas of FIGS. 4A and 4B are different from those of FIGS. 2A and 2B because FIGS. 4A and 4B are illustrated by enlarging step portions of FIGS. 2A and 2B. In addition, it is assumed here that there is no parameter error.

Although the transient responsiveness of the γ-axis current (excitation current) $i\gamma_s$, the δ-axis current (torque current) $i\delta_s$, or the torque is improved in the first embodiment, it is recognized that an electric current waveform and a torque waveform vibrate immediately after the step as seen from the enlarged view of the portion immediately after the step as illustrated in FIGS. 4A and 4B. In comparison, according to the second embodiment, vibration is suppressed in the electric current waveform and the torque waveform immediately after the step.

As described above, according to the second embodiment, the electric current delay filters 20 and 21 are provided to simulate the electric current control delay. Therefore, in addition to the effects of the first embodiment, it is possible to further improve the transient responsiveness of the γ-axis current (excitation current) $i\gamma_s$, the δ-axis current (torque current) $i\delta_s$, or the torque.

Third Embodiment

Figure 5:
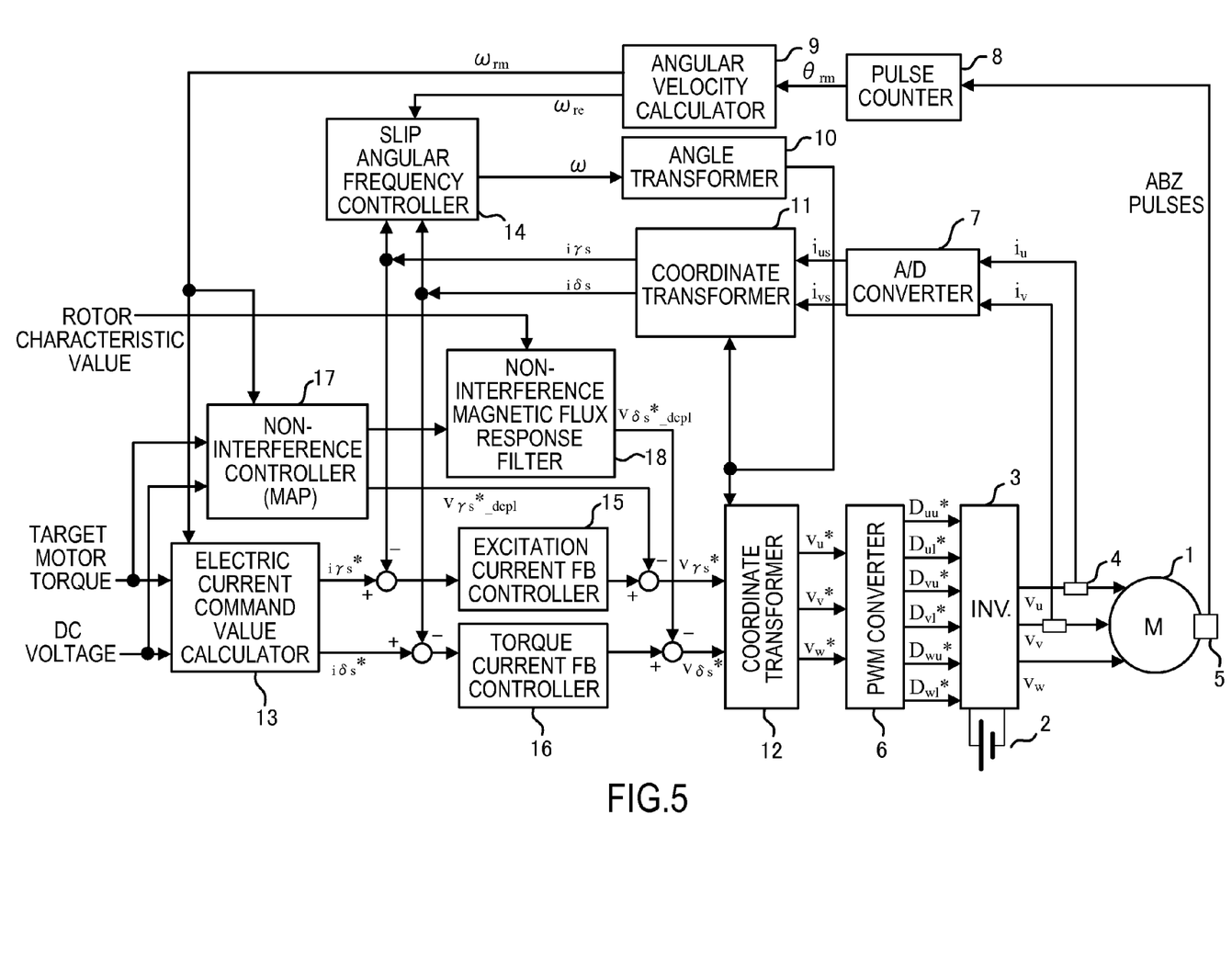
FIG. 5 is a block diagram illustrating a control system of a three-phase AC induction motor according to a third embodiment.

FIG. 5 is a block diagram illustrating a control system of a three-phase AC induction motor according to a third embodiment.

Unlike the first embodiment, the parameter used in the non-interference magnetic flux response filter 18 is a variable value obtained by inputting an estimated or measured value of the rotor characteristic. That is, the characteristic of the non-interference magnetic flux response filter 18 is variable depending on the rotor characteristic. The rotor characteristic includes, for example, a temperature, a resistance, and an inductance of the rotor. In addition, the characteristic of the non-interference magnetic flux response filter includes, for example, a time constant, an occupation ratio between a direct transfer term and a transient term, and the like. Hereinafter, a description will focus on a difference between the first and third embodiments.

In the first and second embodiments, it is possible to improve robustness of the control system for a parameter error caused by a difference of the driving condition. However, the parameters used in the non-interference magnetic flux response filter 18 are also affected by an external factor other than the driving condition, such as high sensitivity against a temperature change. Therefore, a parameter error may be generated by an external factor. In this regard, the parameters used in the non-interference magnetic flux response filter 18 are set to be variable depending on the rotor characteristic in order to match a temperature change. For example, if a temperature of the rotor is used as an input, a resistance $R_r$ of the rotor side (second order side) can be corrected using a temperature coefficient α that changes depending on a material of the rotor as expressed in Formula (7). As a result, a time constant $\tau_f$ of the rotor magnetic flux response delay of Formula (5) changes.

[Formula 7]

$$R_t = R_{20}\{1+\alpha_{20}(t-20)\} \quad (7)$$

It is noted that "$R_t$" of Formula (7) denotes a resistance at a temperature of t[° C.], "$\alpha_{20}$" denotes a temperature coefficient at a temperature of 20[° C.] as a reference, and "$R_{20}$" denotes a resistance at a temperature of 20[° C.] as a reference.

As a result, it is possible to accurately perform non-interference compensation even when a parameter error is generated due to a change of the rotor characteristic. Accordingly, it is possible to remarkably improve responsiveness of an electric current control system.

It is noted that a means for estimating a resistance $R_r$ of the rotor side (second order side) may be provided, and the parameters used in the non-interference magnetic flux response filter 18 may be corrected by using the estimated resistance $R_r$ as an input. In addition, an inductance out of the parameters used in the non-interference magnetic flux response filter 18 depends on an electric current. Therefore, a map may be created in advance such that an electric current is used as an input, and an inductance is used as an output, and the inductance may be corrected using this map.

Figure 6A:
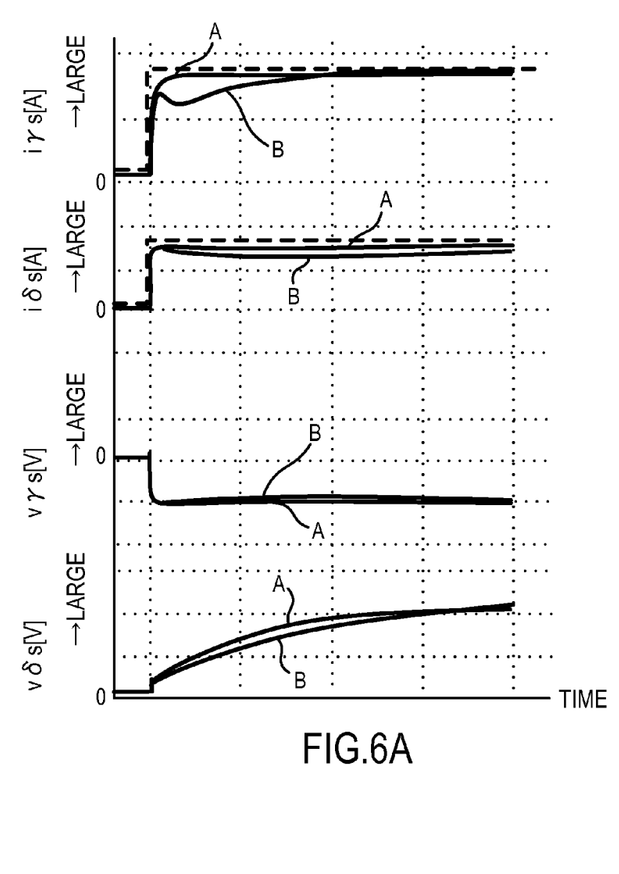
FIG. 6A is a timing chart illustrating current values and voltage values for describing the effects of the third embodiment.
Figure 6B:
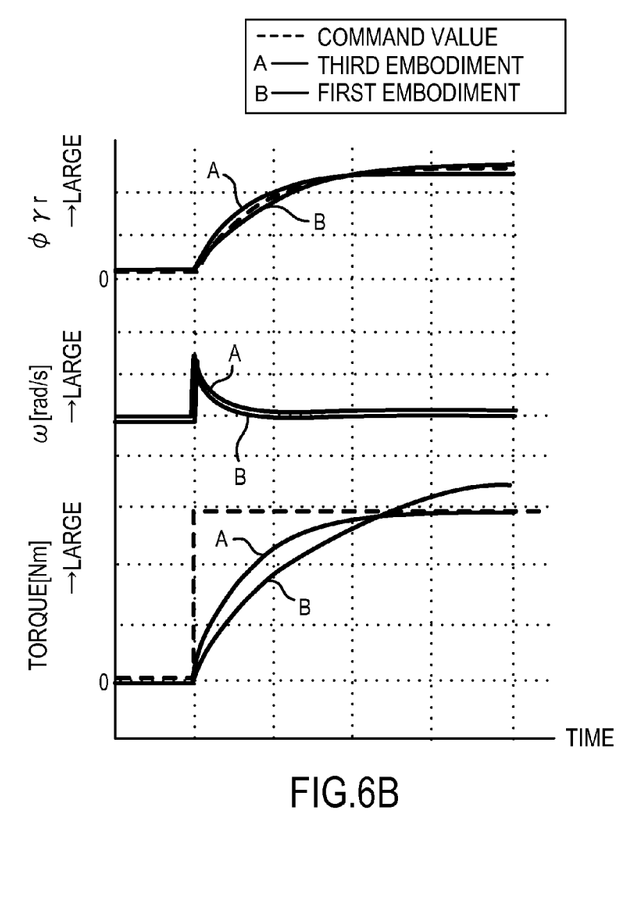
FIG. 6B is a timing chart illustrating a rotor magnetic flux, a power supply angular frequency, and a torque for describing the effects of the third embodiment.

FIGS. 6A and 6B are diagrams illustrating a result of comparison of the torque step response between the third embodiment and the first embodiment when there is a parameter error caused by a temperature change. It is noted that, comparing FIG. 6A and FIG. 2A, the abscissa has the same scale, but the full scale of the ordinate of FIG. 6A is smaller than that of FIG. 2A.

It is recognized that, by setting the parameters used in the non-interference magnetic flux response filter 18 to be variable in consideration of a temperature change as described above, it is possible to further improve an electric current response or a torque response, compared to the first embodiment.

Hereinbefore, according to the third embodiment, in addition to the effects of the first embodiment, it is possible to improve an electric current response or a torque response when there is a parameter error by setting the characteristic of the non-interference magnetic flux response filter 18 to be variable depending on the rotor characteristic.

Fourth Embodiment

Figure 7:
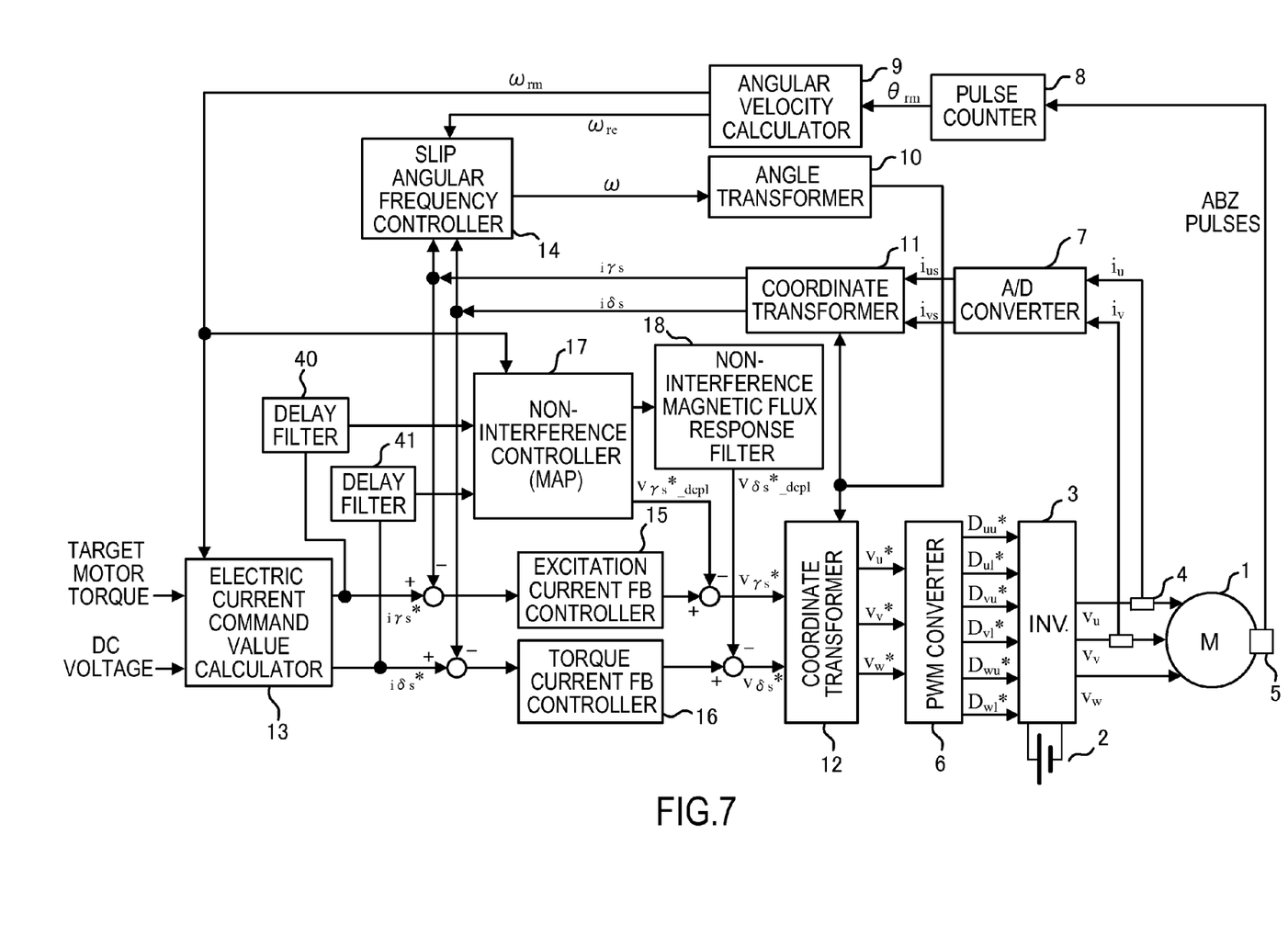
FIG. 7 is a block diagram illustrating a control system of a three-phase AC induction motor according to a fourth embodiment.

FIG. 7 is a block diagram illustrating a control system of a three-phase AC induction motor according to a fourth embodiment. The fourth embodiment is different from the first embodiment in that the non-interference controller 17 receives the motor rotation speed (mechanical angular velocity $\omega_{rm}$), the γ-axis current command value (excitation current command value) $i\gamma_s^*$, and the δ-axis current command value (torque current command value) $i\delta_s^*$ as an input, and electric current delay filters 40 and 41 are provided to perform filtering, including simulation of an electric current delay, for the input of the electric current command value of each axis.

As the electric current delay filters 40 and 41, a digital filter obtained by discretizing the transfer characteristic $G_2(s)$ expressed in Formula (6) described above using Tustin's approximation or the like is employed. The time constant $\tau_c$ is determined based on a response delay of the electric current feedback control system.

In the second embodiment described above, the non-interference controller 17 performs filtering for the non-interference compensation voltage computed based on a map using the electric current delay filters 20 and 21 that simulates an electric current control delay. As a result, it is possible to sufficiently improve torque responsiveness and the like. However, the map is referenced using an electric current command value without considering an electric current control delay.

Therefore, an influence of the electric current control delay still remains in transient responsiveness, compared to an ideal non-interference compensation based on a mathematical model.

In contrast, according to the fourth embodiment, filtering, in which the electric current control delay is simulated, is performed for the electric current command values $i\gamma_s^*$ and $i\delta_s^*$ computed using the electric current command value calculator 13, and the filtering result is used as an input of the non-interference controller 17. Therefore, it is possible to reflect an electric current control delay in a more appropriate position. Accordingly, it is possible to accurately perform non-interference compensation even when a parameter error is generated due to a difference of the driving condition. As a result, it is possible to remarkably improve responsiveness of an electric current control system.

Figure 8A:
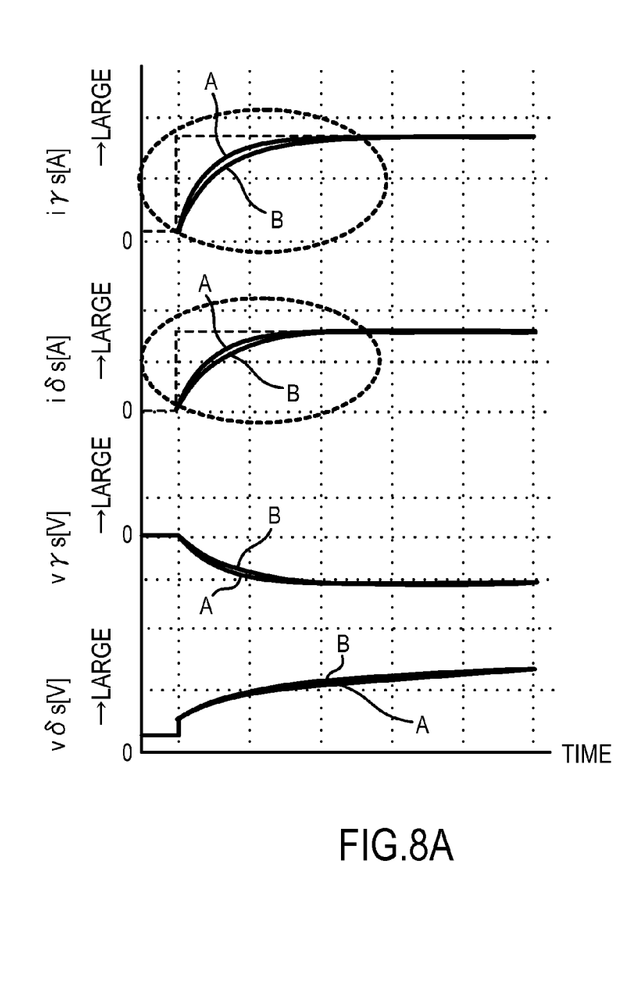
FIG. 8A is a timing chart illustrating current values and voltage values for describing the effects of the fourth embodiment.
Figure 8B:
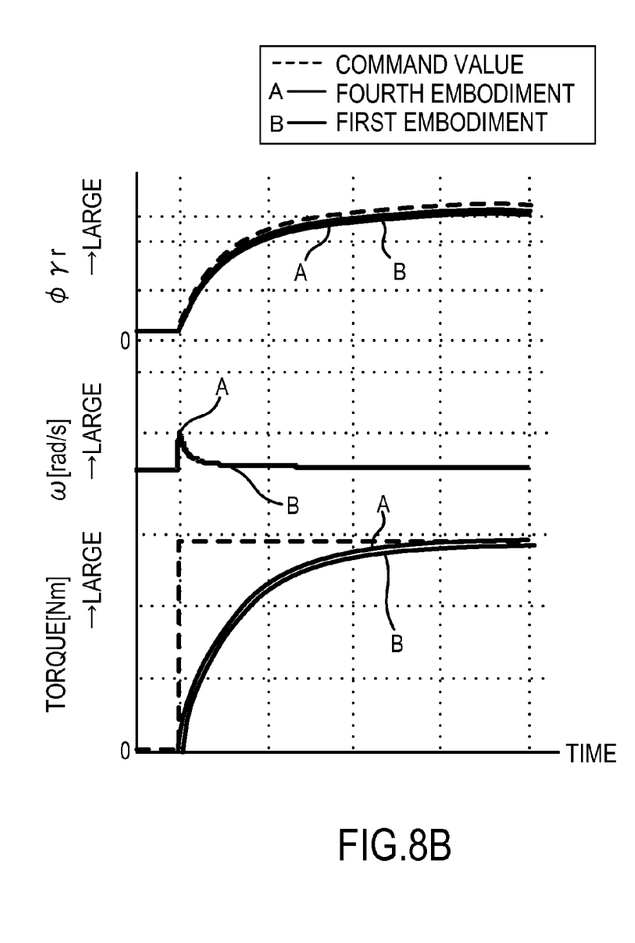
FIG. 8B is a timing chart illustrating a rotor magnetic flux, a power supply angular frequency, and a torque for describing the effects of the fourth embodiment.

FIGS. 8A and 8B are diagrams illustrating a result of comparison of the torque step response between the fourth embodiment and the first embodiment. It is noted that FIGS. 8A and 8B are obtained by further enlarging the step portions of FIGS. 2A and 2B, compared to FIGS. 4A and 4B, and the scales of the ordinate and the abscissa are different from those of FIGS. 2A and 2B. In addition, it is assumed here that there is no parameter error.

As described above, by reflecting an electric current control delay in an appropriate position, it is possible to further improve responsiveness of the γ-axis current (excitation current) $i\gamma_s$ and the δ-axis current (torque current) $i\delta_s$ at the time of the torque step, compared to the first embodiment, as indicated by the encircled portions of FIG. 8A.

As described above, according to the fourth embodiment, in addition to the effects of the first embodiment, it is possible to further improve responsiveness of an electric current control system by performing filtering, in which an electric current control delay is simulated, for the electric current command values $i\gamma_s$ and $i\delta_s$.

Although various embodiments of this disclosure have been described hereinbefore, they are just for illustrative purposes and are not intended to specifically limit the technical scope of the invention. Instead, it would be appreciated that various changes or modifications may be possible without departing from the spirit and scope of the invention.

This application claims priority based on Japanese Patent Application No. 2012-065887 filed with the Japan Patent Office on Mar. 22, 2012, the entire contents of which are expressly incorporated herein by reference.

The invention claimed is:

1. A three-phase AC induction motor control device configured to control a torque based on a two-axis orthogonal coordinate system in synchronization with a power supply angular frequency, the control device comprising:
   a non-interference controller configured to receive a motor rotation speed, a torque command value, and a power supply voltage as an input and compute a torque axis non-interference compensation voltage and a magnetic flux axis non-interference compensation voltage by referencing a map stored in advance; and
   a non-interference magnetic flux response filter configured to perform filtering for the torque axis non-interference compensation voltage depending on a rotor magnetic flux response delay.

2. The three-phase AC induction motor control device according to claim 1, wherein the three-phase AC induction motor control device is configured perform an electric current feedback control and further comprises:
   a first filter configured to perform a delay process, in which an electric current control delay in the electric current feedback control is simulated, for the magnetic flux axis non-interference compensation voltage; and
   a second filter configured to perform a delay process, in which an electric current control delay in the electric current feedback control is simulated, for the torque axis non-interference compensation voltage.

3. The three-phase AC induction motor control device according to claim 1, wherein the non-interference magnetic flux response filter is configured to perform filtering corresponding to a rotor characteristic value that changes depending on a driving condition of the rotor such that a value matching the driving condition of the rotor is obtained as a torque axis non-interference compensation voltage after the filtering.

4. The three-phase AC induction motor control device according to claim 1, wherein the three-phase AC induction motor control device is configured perform an electric current feedback control and further comprises:
   an electric current command value calculator configured to receive a torque command value, a motor rotation speed, and a power supply voltage as an input and generate an excitation current command value and a torque current command value by referencing a map stored in advance;
   a third filter configured to perform filtering, in which an electric current control delay of the electric current feedback control is simulated, for the torque current command value; and
   a fourth filter configured to perform filtering, in which an electric current control delay of the electric current feedback control is simulated, for the excitation current command value, and
   the non-interference controller is configured to receive the motor rotation speed, the torque current command value subjected to the filtering of the third filter, and the excitation current command value subjected to the filtering of the fourth filter, instead of the motor rotation speed, the torque command value, and the power supply voltage, and compute the torque axis non-interference compensation voltage and the magnetic flux axis non-interference compensation voltage by referencing a map stored in advance.

5. A three-phase AC induction motor control method for controlling a torque based on a two-axis orthogonal coordinate system in synchronization with a power supply angular frequency, the method comprising:
   computing a torque axis non-interference compensation voltage and a magnetic flux axis non-interference compensation voltage based on a torque command value, a motor rotation speed, and a power supply voltage by referencing a map stored in advance; and
   performing filtering for the torque axis non-interference compensation voltage depending on a rotor magnetic flux response delay.

6. A three-phase AC induction motor control device configured to control a torque based on a two-axis orthogonal coordinate system in synchronization with a power supply angular frequency, the control device comprising:
   a non-interference control means for receiving a motor rotation speed, a torque command value, and a power supply voltage as an input and computing a torque axis non-interference compensation voltage and a magnetic flux axis non-interference compensation voltage by referencing a map stored in advance; and
   a non-interference magnetic flux response filtering means for performing filtering for the torque axis non-interference compensation voltage depending on a rotor magnetic flux response delay.

* * * * *